Patented Nov. 6, 1945

2,388,496

UNITED STATES PATENT OFFICE 2,388,496

METHOD OF PREPARING COPPER ARSENICALS

George W. Pearce and Alfred W. Avens, Geneva, N. Y.

No Drawing. Original application June 18, 1940, Serial No. 341,179. Divided and this application August 9, 1943, Serial No. 497,969

3 Claims. (Cl. 23—53)

This is a division of application Serial No. 341,179, filed June 18, 1940, for Arsenical insecticides, issued March 21, 1944, as Patent No. 2,344,895. The claims in that case are directed particularly to basic calcium arsenate; the claims in the present case are directed particularly to basic copper arsenate; and in a companion divisional application filed cotemporaneously herewith the claims are directed to zinc calcium arsenate. The present invention relates to insecticides and fungicides of the arsenic type, and its principal object is broadly to provide a commercial method of producing arsenicals of definite chemical composition so as to have consistent and easily reproducible properties. Various specific objects will become apparent as the description proceeds. While arsenic has long been recognized as a useful economic poison, the chief problem in its use as an insecticide has been the difficulty in standardizing the commercial products employed, due to the fact that they generally involved mixtures of various arsenical compounds having different chemical and physical properties. While considerable improvements have been made in such commercial arsenicals, they have continued to produce inconsistent behavior with respect to insect toxicity and plant injury. The difficulty appears to be due to the fact that in most prior processes it was practically impossible to obtain anything but mixtures of two or more species of arsenates. These prior processes started with arsenic acids and generally ended up with mixtures, instead of a definite compound. The only important exception in the commercial insecticide field is di-lead arsenate, which is a compound of definite composition, generally produced from litharge and arsenic acid, using acetic acid as a catalyst. Lead however has many objectionable qualities, particularly where the production of food is concerned. Unfortunately, arsenates of other more desirable metals cannot be produced by the same type of reaction that produces di-lead arsenate.

By the invention described in the application of which this is a division it is possible to commercially produce a single definite species of calcium arsenate, namely basic calcium arsenate, and by the present invention it is possible to produce either copper calcium arsenate or basic copper arsenate, though the processes are entirely different from the previous lead method above mentioned. The processes differ fundamentally from the prior processes in that they use dicalcium arsenate as the starting material, instead of arsenic acid. We will now describe specifically the use of dicalcium arsenate in the preparation of copper calcium arsenate suitable for use as an insecticide.

When arsenical sprays are used on plant foliage, arsenical injury to the foliage and the fruit frequently results. To avoid this difficulty, copper and some of its compounds can act as arsenical injury correctives or preventatives when used in an insecticidal spray or dust mixture. Weak Bordeaux mixture for example has proved very efficient in this capacity. We have found that if one treats dicalcium arsenate, itself a very toxic substance to plant foliage, with copper or various compounds of copper, a highly insoluble copper calcium arsenical is obtained which is substantially safe to foliage. When insoluble copper bearing materials are used to combine with dicalcium arsenate, it is best to mix the reactants intimately in a dry state and subject the mixture to an autoclaving operation for about 2 hours at 10–15 kgs./sq. cm. steam pressure (140–210 pounds per sq. inch). As a further illustration of the principles indicated above, we have heat treated dicalcium arsenate in the presence of the representative materials given in Table 1. In each instance a reaction proceeds in which the dicalcium arsenate is converted to a more insoluble arsenate suitable for insecticidal and in some instances also fungicidal purposes.

Table 1

| Parts of dicalcium arsenate | Parts of reacting material |
|---|---|
| 155 | 47 copper (powdered metal). |
| 7 | 4 cuprous oxide (powdered). |
| 7 | 4 cupric oxide (powdered). |

The various treatments indicated in Table 1 were carried out by intimately mixing the dicalcium arsenate with the various materials shown and then autoclaving the mixture with steam for 2 hours at 10–15 kgs. per sq. cm. The reacting materials were added in excess over that required to displace all the hydrogen present in the dicalcium arsenate. In general when dicalcium arsenate is treated with metals or their oxides the primary reaction appears to be displacement of the hydrogen and formation of a double salt.

On the other hand if treated with sulfates, chlorides, nitrates and other salts or compounds of metals, the reaction may result in displacement of both the hydrogen and calcium present in dicalcium arsenate, with the formation of an arsenate of the metal whose salt was used in the treatment. In the case of soluble copper materials the calcium arsenate may be treated by boiling the arsenate in a solution of the copper bearing material. By the latter procedure, for example, one can prepare basic copper arsenate, a newly introduced arsenical having good insecticidal and fungicidal properties. The following procedure results in a very pure basic copper arsenate $(Cu(CuO)AsO_4)$.

Five (5) parts of powdered dicalcium arsenate are suspended in 100 parts of water and 2 parts of copper in the form of copper nitrate dissolved in about 5 parts of water are added. The mixture is heated to boiling and stirred for about one-half hour. The precipitate first formed in the mixture is a voluminous hydrated mass and on heating tends to dehydrate and become crystalline. The product is filtered off, dried and ground. The analysis will be very close to the theory for basic copper arsenate $(Cu(CuO)AsO_4)$.

It will be evident from the foregoing that the use of dicalcium arsenate in place of the usual arsenic bearing starting materials makes possible the production of various arsenical preparations having consistent and easily reproducible properties. While dicalcium arsenate does not appear to be commercially available at the present time, it is easily and cheaply prepared on a commercial scale if desired by several methods, more or less well known, some of which are reviewed in the parent application of which this is a division, and it is not necessary to repeat them here. Moreover, since the anhydrous form $(CaHAsO_4)$ of dicalcium arsenate as well as the completely dehydrated form known as calcium pyroarsenate $(Ca_2As_2O_7)$ are readily returned to the monohydrated or other hydrated forms of dicalcium arsenate, it will be understood that the process includes the use of these other forms for the manufacture of arsenicals. The arsenicals described are particularly useful in controlling insect pests of plants, but it will of course be understood that they may also be used for any other purposes to which they are suited.

While in the foregoing we have given specific examples of the type of process, it will be understood that it is merely by way of illustration to make clear the principles of the invention, which is not limited to the particular examples shown, but is susceptible to various modifications and adaptations in different instances as will be apparent to those skilled in the art, without departing from the scope of the invention as stated in the following claims.

We claim:

1. The method of preparing copper arsenicals of definite composition, which consists in taking solid dicalcium arsenate, mixing it with copper bearing material in excess, and heating the mixture to a temperature at which the reacting materials react to form a copper arsenical compound.

2. The method of preparing copper calcium arsenate, which consists in taking solid powdered dicalcium arsenate intimately mixed with copper bearing material in excess selected from the group consisting of solid powdered copper and its oxides, and heating the mixture to a temperature at which the reacting materials react to form copper calcium arsenate.

3. The method of preparing basic copper arsenate, which consists in taking dicalcium arsenate and boiling it in a solution of a copper salt, the anion of which reacts with the calcium of the dicalcium arsenate to form a soluble calcium compound, and separating and drying the basic copper arsenate.

GEORGE W. PEARCE.
ALFRED W. AVENS.